(12) United States Patent
Bazzo (10) Patent No.: US 9,981,414 B2
(45) Date of Patent: May 29, 2018

(54) METHOD AND APPARATUS FOR INJECTION MOLDING OF PLASTIC MATERIALS

(71) Applicant: INGLASS S.p.A., San Polo di Piave (Treviso) (IT)

(72) Inventor: Maurizio Bazzo, San Polo di Piave (IT)

(73) Assignee: INGLASS S.p.A., Orbassano (Turin) (IT)

( * ) Notice: Subject to any disclaimer, the term of this patent is extended or adjusted under 35 U.S.C. 154(b) by 336 days.

(21) Appl. No.: 14/843,123

(22) Filed: Sep. 2, 2015

(65) Prior Publication Data
US 2016/0067901 A1 Mar. 10, 2016

(30) Foreign Application Priority Data
Sep. 8, 2014 (IT) .............................. TO2014A0701

(51) Int. Cl.
| | | |
|---|---|---|
| *B29C 45/76* | (2006.01) | |
| *B29C 45/23* | (2006.01) | |
| *B29C 45/18* | (2006.01) | |
| *B29C 45/77* | (2006.01) | |
| *B29C 45/28* | (2006.01) | |

(52) U.S. Cl.
CPC .............. *B29C 45/76* (2013.01); *B29C 45/18* (2013.01); *B29C 45/231* (2013.01); *B29C 45/2806* (2013.01); *B29C 45/77* (2013.01); *B29C 2045/2824* (2013.01); *B29C 2945/7602* (2013.01); *B29C 2945/76274* (2013.01); *B29C 2945/76381* (2013.01); *B29C 2945/76384* (2013.01); *B29C 2945/76859* (2013.01); *B29C 2945/76862* (2013.01)

(58) Field of Classification Search
CPC .............................. B29C 45/76; B29C 45/231
See application file for complete search history.

(56) References Cited

U.S. PATENT DOCUMENTS

| | | | |
|---|---|---|---|
| 5,639,486 A | 6/1997 | Yamaguchi | |
| 5,869,108 A * | 2/1999 | Hiraoka | ............... B29C 45/5008 264/40.7 |

(Continued)

FOREIGN PATENT DOCUMENTS

| | | |
|---|---|---|
| JP | H07304072 A | 11/1995 |
| JP | 2002059467 | 2/2002 |

(Continued)

OTHER PUBLICATIONS

Search Report for Italian Patent Application No. TO2014A000701 dated May 6, 2015, 7 pages.

(Continued)

*Primary Examiner* — Benjamin A Schiffman
(74) *Attorney, Agent, or Firm* — RMCK Law Group PLC (57) ABSTRACT

Injection molding of plastic materials by an apparatus comprising at least one injector including a valve pin displaceable in a controlled manner between a closed position and an open position by an electric rotary actuator. At least one step is provided of detecting the value of the torque developed by the electric rotary actuator when the valve pin is in the path from the closed position to the open position, and the torque value detected is used to pilot the molding process.

11 Claims, 4 Drawing Sheets

(56) References Cited

U.S. PATENT DOCUMENTS

| | | | |
|---|---|---|---|
| 6,379,119 B1 * | 4/2002 | Truninger | B29C 45/82 264/40.1 |
| 8,939,757 B2 * | 1/2015 | Ikeda | B29C 45/076 425/574 |
| 2004/0185142 A1 | 9/2004 | Olaru | |
| 2005/0123641 A1 * | 6/2005 | Kim | B29C 45/281 425/547 |
| 2013/0266680 A1 * | 10/2013 | Todesco | B29C 45/23 425/162 |
| 2013/0302468 A1 * | 11/2013 | Ikeda | B29C 45/076 425/574 |

FOREIGN PATENT DOCUMENTS

| | | | |
|---|---|---|---|
| JP | 2005280356 A | 10/2005 | |
| JP | 2007210164 A | 8/2007 | |
| JP | 2009298091 | 12/2009 | |
| JP | 2013052622 A | 3/2013 | |

OTHER PUBLICATIONS

Braun, P. "Praezise Positionieren", Plastverarbeiter, Huethig GmbH, Heidelberg, DE, Dec. 1, 2005, p. 38/39, XP001155127, ISSN: 0032-1338.

English Translation of Office Action dated Oct. 17, 2017 for Japanese Patent Application No. 2015-175398 (JP2015-175398 corresponds to U.S. Appl. No. 14/843,123), 2 pages.

\* cited by examiner

METHOD AND APPARATUS FOR INJECTION MOLDING OF PLASTIC MATERIALS

CROSS REFERENCE TO RELATED APPLICATIONS

This application claims priority to Italian Patent Application No. TO2014A000701 filed on Sep. 8, 2014, the entire disclosure of which is incorporated herein by reference.

FIELD OF THE INVENTION

The present invention relates to injection molding of plastic materials and particularly relates to a method of injection molding by means of an apparatus comprising a distributor of the fluid plastic material under pressure connected to at least one injector including a valve pin displaceable between a closed position and an open position.

Typically, these injection molding methods comprise a step of filling the mold cavity with the plastic material, following displacement of the valve pin from the closed position to the open position, followed by a packing step under pressure of the plastic material injected into the cavity, in which the valve pin is kept in the open position. The valve pin is then displaced from the open position to the closed position and, after a waiting time to allow the plastic material to solidify, the molded article is extracted from the mold.

The displacements of the valve pin of the or each injector are traditionally operated by means of a fluid actuator. Recently apparatuses have been proposed in which the valve pin is driven by an electric rotary actuator, in a controlled manner, by means of electronic systems.

STATE OF THE PRIOR ART

The use of electric actuators for driving the valve pin of the or each injector of the molding apparatus is described, for example, in documents JP-06114887, U.S. Pat. No. 7,121,820 and EP-2,679,374 (by the same Applicant). The electric actuators, compared with fluid actuators, are much more easily controllable with the aid of electronic systems, which operate on the basis of process parameters, detected by appropriate sensors, and/or by means of specific algorithms. In this way, it is possible to operate an efficient control of both the position of the valve pin between the closed position and the open position to vary the flow of the injected plastic material during the molding cycle, as described in document U.S. Pat. No. 6,294,122, and the speed of displacement of the valve pin during its movement from the closed position to the open position. Thus, the documents WO-2012/074879 and WO-2012/087491 provide for the control of the electric actuator to displace the valve pin in a continuous manner from the closed position to the open position at an initial speed, and then to one or more higher speeds compared to the initial one. This control is operated as a function of the time or the space covered by the valve pin starting from its closed position.

Controlling the position of an electrically-actuated valve pin is also known from JP-2009298091A, JP-2002059467A. The publication "BRAUN P.: "PREAZISE POSITIONIERN", Plastverarbeiter, Huethig GmbH, Heildelberg DE, 1 Dec. 2005, pages 38-39, XP001155127, discloses the valve pin being controllably operated by an electrical actuator and a torque is detected and employed for providing a malfunction detection.

This type of control is difficult to be correlated to the actual process conditions, or rather to a series of strongly variable parameters, for example, as a function of the changes in working conditions and the physical state of the plastic material (temperature, viscosity, packing conditions within the mold) etc.

A more accurate control would be particularly desirable for the injection molding of articles for which a high quality is required, both from a mechanical and an aesthetic point of view, for example, in the case of large motor vehicle components such as bumpers and the like. In this case, the molding apparatus typically includes a certain number of injectors distributed in the different zones of the mold: in the case in which these injectors are fed by a single distributor, appreciable differences in pressure and density of the injected plastic material can be generated between the zones of the cavity next to the central injector(s) and those corresponding to the peripheral injectors. For this reason, in these cases, a sequential injection is used, in which the filling step of the mold cavity is in fact carried out by sequentially controlling the opening of the valve pins of the different injectors so as to progressively fill the mold cavity, starting from the central zone towards the peripheral zones. In this case, the valve pins of the central injectors can remain open during the entire injection cycle, or can be displaced to the closed position following the opening of the valve pins of the peripheral injectors. In this way, advancing of the filling front of the mold cavity is improved, and the localized pressure caused by the accumulation of the plastic material in the initially-filled zones of the cavity is reduced.

Particularly in the case of this type of sequential injection, the filling step and the subsequent packing step must be well balanced between the various injectors and the different zones of the cavity, as otherwise, deformation problems of the molded piece could be generated as well as tensionings with consequent reduction of the mechanical properties, localized increases in thickness, and in some cases filaments and breakages during the molding step.

Similar problems, albeit minor, can also occur in injection molding of articles whose dimensions do not necessarily require a sequential methodology.

SUMMARY OF THE INVENTION

The object of the invention is to make an efficient solution to the above technical problems available, through a control of the injection process that is more directly correlated to the actual process parameters as well as to their variability.

In view of achieving this object, the invention relates to a method for injection molding of the type defined at the beginning, whose unique characteristic lies in the fact that it provides at least one detecting step of the value of the torque developed by the electric rotary actuator when the valve pin is in the path from said closed position to said open position, the torque value detected being employed to pilot the molding process.

The invention is based on the finding that the torque developed by the electric motor, which is required to move the valve pin, and also possibly to keep it temporarily stationary along the opening path, is a function of the pressure of the plastic material injected into the mold. Through the detected torque value, the control of the electric actuator can, for example, act on the positioning of the valve pin to increase or reduce the flow of plastic material into the mold, or act on its speed, varying it in a suitable manner.

The detection of the torque developed by the electric actuator deriving from forces acting on the valve pin can be carried out in a more precise and accurate in static conditions, or rather with a non-moving valve. To this effect, the invention advantageously envisages that the movement of the valve pin from the closed position to the open position is discontinuous and includes at least one temporary stop step of the valve pin in which the detecting step of the torque value of the electric actuator is carried out. This stop step can be followed by a brief return step of the valve pin towards the closed position, for a predetermined amount. This is particularly useful given the fact that, because of the coupling clearances between the pin and the actuator, the position of the latter may not be univocally determined: the inversion of the movement of the valve allows, after its arrest, detection of the torque of the electric motor having recovered any possible clearance.

Since the torque value is not always directly proportional to the injection pressure, it is convenient to proceed to a preliminary initial calibration step in which the detection of the torque value is conveniently carried out during the course of a series of empty opening and closing cycles of the valve pin, i.e. without injecting the plastic material into the mold.

The method according to the invention is particularly advantageous in processes of sequential injection, which has been previously mentioned: in this case, the value of torque developed by the electric rotary actuator of the valve pin of each injector is detected, and the torque values detected are employed, for example, to make these torques essentially uniform by means of movement variations of the valve pins. This allows an optimal distribution of the pressure inside the mold cavity to be obtained, and therefore, ultimately, a better quality of the articles molded as such.

According to another aspect of the invention, an apparatus for injection molding of plastic materials into a mold cavity is provided, comprising a distributor of fluid plastic material under pressure connected to at least one injector including a valve pin displaceable between a closed position and an open position, wherein the valve pin is controllably operated by an electric rotary actuator, characterized in that it is configured to detect the value of the torque developed by the electric rotary actuator at least when the valve pin is in the path from said closed position to said open position, and to employ the detected torque value to pilot the molding process.

During the molding method, at the end of the opening step, the vale pin is kept stationary in a packing step of the plastic material injected into the mold, and then returns to the closed position. Preferably, the apparatus according to the invention is configured to also detect the value of the torque developed by the electric rotary actuator during the packing step and/or during the return of the valve pin to the closed position.

Conveniently, the apparatus according to the invention is also configured for performing the movement of the valve pin from the closed position to the open position in a discontinuous manner, with at least one temporary stop step in which said detecting step of the torque value is carried out. This temporary stop step can be followed by a return step of the valve pin towards said closed position, for a predetermined amount.

BRIEF DESCRIPTION OF THE FIGURES

The invention will now be described in detail with reference to the attached drawings, provided purely by way of non-limiting example, in which.

DETAILED DESCRIPTION OF THE INVENTION

Figures 1, 2:
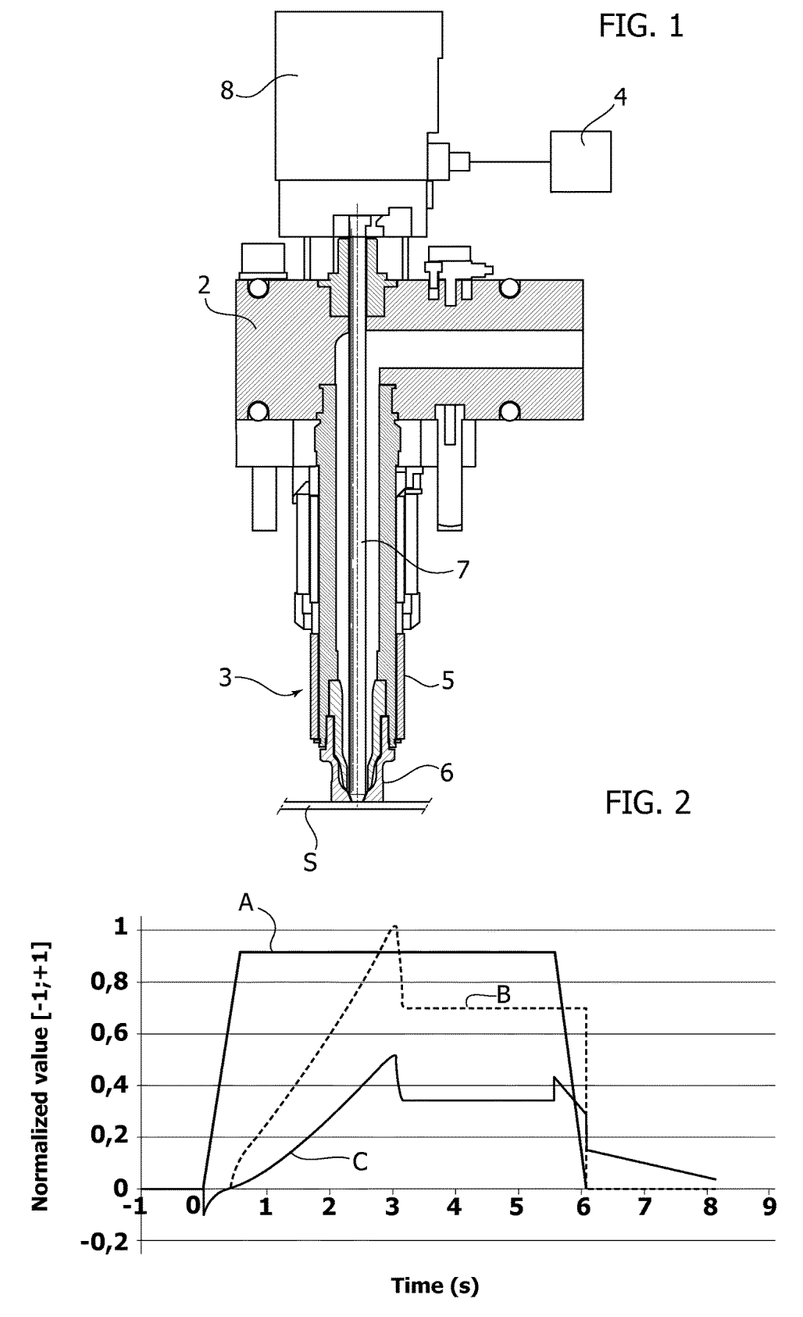
FIG. 1 is a schematic view in partial cross-section showing a part of a conventional injection molding apparatus.
FIG. 2 is a normalized diagram which shows the graph of the stroke of the valve pin, of the injection pressure and the torque developed by the electric actuator of the molding apparatus of FIG. 1 during an injection cycle, as a function of the time.

FIG. 1 schematically shows an apparatus for injection molding of plastic materials comprising, in a generally conventional manner, an injector 3 connected to a distributor of the melted plastic material or hot chamber 2 and comprising a nozzle 5 provided at its free end with a nozzle terminal 6 in communication with the cavity of a mold S through an injection passage ("gate"). The flow of the plastic material through the nozzle terminal 6 is controlled by a valve pin 7 axially displaceable along the nozzle 5 by an actuator 8, between a lowered closed position shown in FIG. 1, and a raised open position.

The actuator 8 is an electric actuator, and more specifically a rotary electric motor: its arrangement, represented in FIG. 1, is purely indicative, as it is conveniently of the type described and illustrated in the already cited document EP-2,679,374 by the same Applicant, according to which the rotary shaft of the electric motor 8 drives the valve pin 7 through a reversible-type transmission, typically including a screw and nut unit and a pivoting lever.

The electric motor 8 is operatively connected to an electronic control unit 4 configured to drive the electric motor 8, and consequently the valve pin 7, in a controlled manner as a function of various parameters including, as will be seen, the value of the torque developed by the electric motor 8 during the displacement of the valve pin 7 and specifically when it is in the path from the closed position to the open position.

The invention envisages that the injection cycle of the plastic material into the cavity of the mold S is in fact also controlled i.e. piloted by means of the torque value, detected with systems within the scope of those skilled in the art, which is a function of the forces acting on the valve pin 7.

FIG. 2 shows, in normalized diagram form, the correlation between the stroke of the valve pin (solid line A) from the closed position to the open position, the trend of the injection pressure (the graph with the dashed line B) and that of the torque developed by the electric motor 8 (graph with a solid line C), as a function of the time. Typically, the injection cycle comprises a step of filling the mold cavity S with the plastic material, following the displacement of the valve pin 7 from the closed position to the open position, followed by a packing step under pressure of the plastic material injected into the cavity, in which the valve pin 7 is kept stationary in the open position. The valve pin 7 is then made to return from the open position to the closed position.

As seen in the diagram of FIG. 2, the injection pressure gradually increases up to a maximum reached at the packing step, and then decreases and remains essentially constant, and then zeroes when the valve pin 7 returns to the closed position. The torque developed by the electric motor 8 is firstly negative, at the beginning of the opening of the valve pin 7, and increases with the increase of the injection pressure essentially following the trend, even at the packing step, at the end of which it increases again to start the return of the valve pin 7 towards the closed position, and then progressively decreases up to a value sufficient to keep the valve pin 7 closed with the mold cavity S full and packed.

Figure 3:
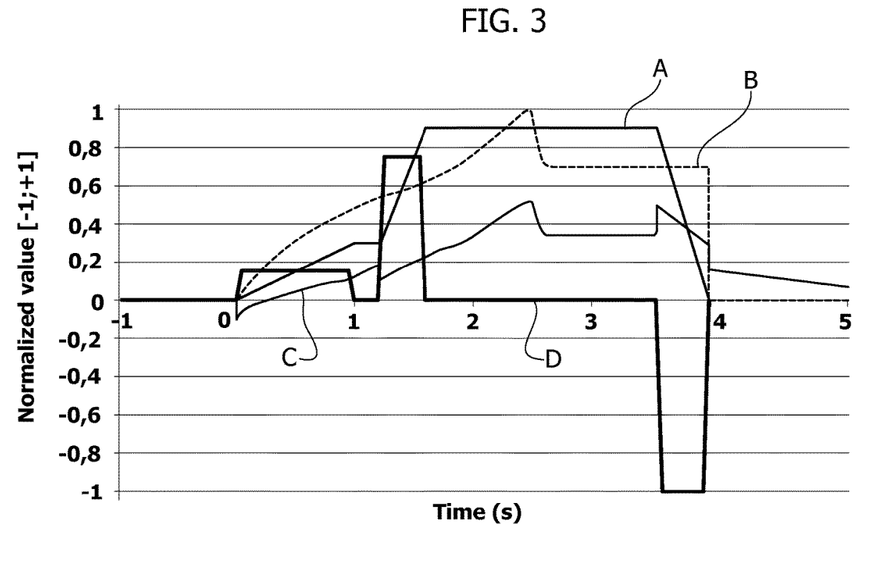
FIG. 3 is a diagram analogous to that of FIG. 2 in which the speed of the valve pin has been added to the graph.

In the diagram of FIG. 3, the graphs A relative to the stroke of the valve pin 7, B relative to the injection pressure and C relative to the torque developed by the electric actuator 8 are represented, as a function of time, in the case in which the speed of displacement of the valve pin 7 from the closed position to the open position is not constant, but includes an initial step at a first speed, followed by an intermediate step at a higher speed (and possibly a final step at an even greater speed). The trend of the speed is represented in FIG. 3 by graph D: as can be seen, the motion of the valve pin 7 from the closed position to the open position is not continuous but is discontinuous, as at least one stop step is provided, shown in the graph of FIG. 3 by the stretch at zero speed between the initial stretches at a lower speed and those at an intermediate speed or the final higher speed of graph D. This stop step of the valve pin 7 is considered appropriate and advantageous for a more precise detection of the torque developed by the electric motor 8 during the injection cycle: in fact, during the movement of the valve pin 7, the measured torque value is not easily correlatable to the injection pressure, as there are dynamic sliding effects of the valve 7 on the relative valve guide, as well as friction, even at the level of the kinematic mechanisms, which has been mentioned above, in the transmission between the electric motor 8 and the valve 7. It is therefore more appropriate to detect the torque when the valve pin 7, and therefore the electric motor 8, are stationary for a period of time that can also be very brief.

Figure 4:
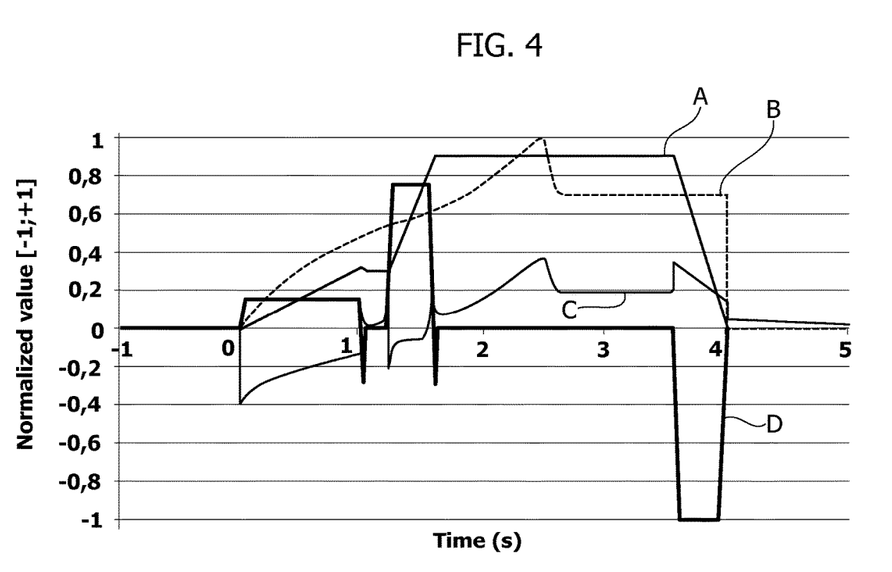
FIG. 4 is a diagram analogous to that of FIG. 3 relative to the case in which a stop step of the valve pin during its opening displacement is envisaged.

The diagram of FIG. 4 is analogous to that of FIG. 3 and differs therefrom by the fact that the trend of speed of the valve pin 7 represented by the graph D shows, at the instant of stopping the movement of the valve pin 7 towards the open position, a brief reversal of motion in which there is a step of partial return towards the closed position. This reversal, of a slight, predetermined amount, advantageously allows detection of the value of the torque developed by the electric motor 8, also taking account the clearances present in the relative transmission kinematic mechanism, and in particular between the end of the valve pin 7 opposite to the nozzle terminal 6 and its attachment to the transmission driven by electrical motor 8. This connection, typically produced by means of a head of the valve 7 coupled with a clearance generally in the order of 0.1-0.2 mm to a bayonet seat, can determine a non-univocal position of the valve 7 itself. In fact, if during the opening movement, the drag forces operated by the fluid plastic material on the valve 7 are high, this valve 7 will be closer to the lower abutment of the bayonet seat relative to its head. The brief return movement of the valve pin 7 operated following its arrest then allows recovery of the clearance mentioned above and obtainment of a more accurate torque measurement.

An analogous step of brief motion reversal of the valve pin 7 can also be provided at the end of its opening stroke, or rather at the beginning of the packing step of the plastic material into the mold cavity, for a further detecting step of the torque developed by the electric motor 8.

The methodology described above with reference to the single injector 3 is advantageously applicable to the case of sequential injection operated through a plurality of injectors arranged in a series with a central injector 3a, intermediate injectors 3b, 3c and end injectors 3d, driven by respective rotary electric motors 8a, 8b, 8c, 8d, controlled while allowing for the detection of the torque developed thereby.

Figure 5:
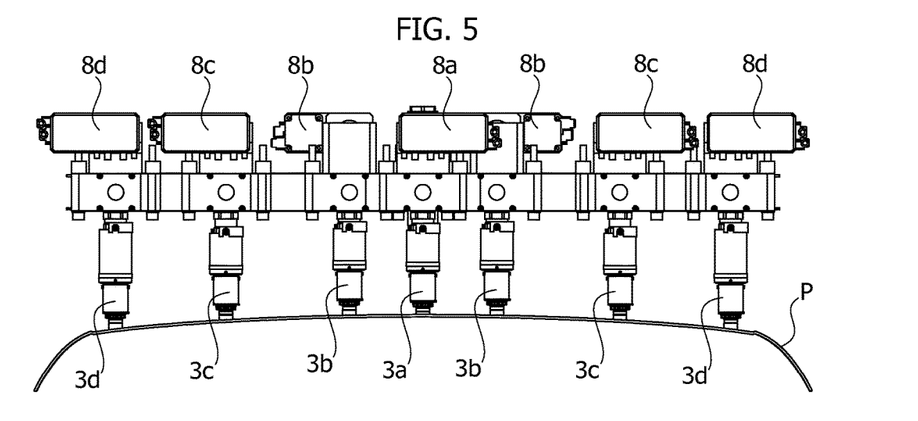
FIG. 5 is a schematic elevation view showing a configuration of the molding apparatus suitable for carrying out a cycle of sequential injection.

In the case of the example represented in FIG. 5, the sequential injection molding apparatus is used for producing a large article with high aesthetic value, such as a bumper P for cars. The injectors 3a-3d are fed from a common distributor or hot chamber 2 and are positioned as such: the first one at a central injection passage of the mold, and the others at gradually more peripheral injection passages.

Figure 6:
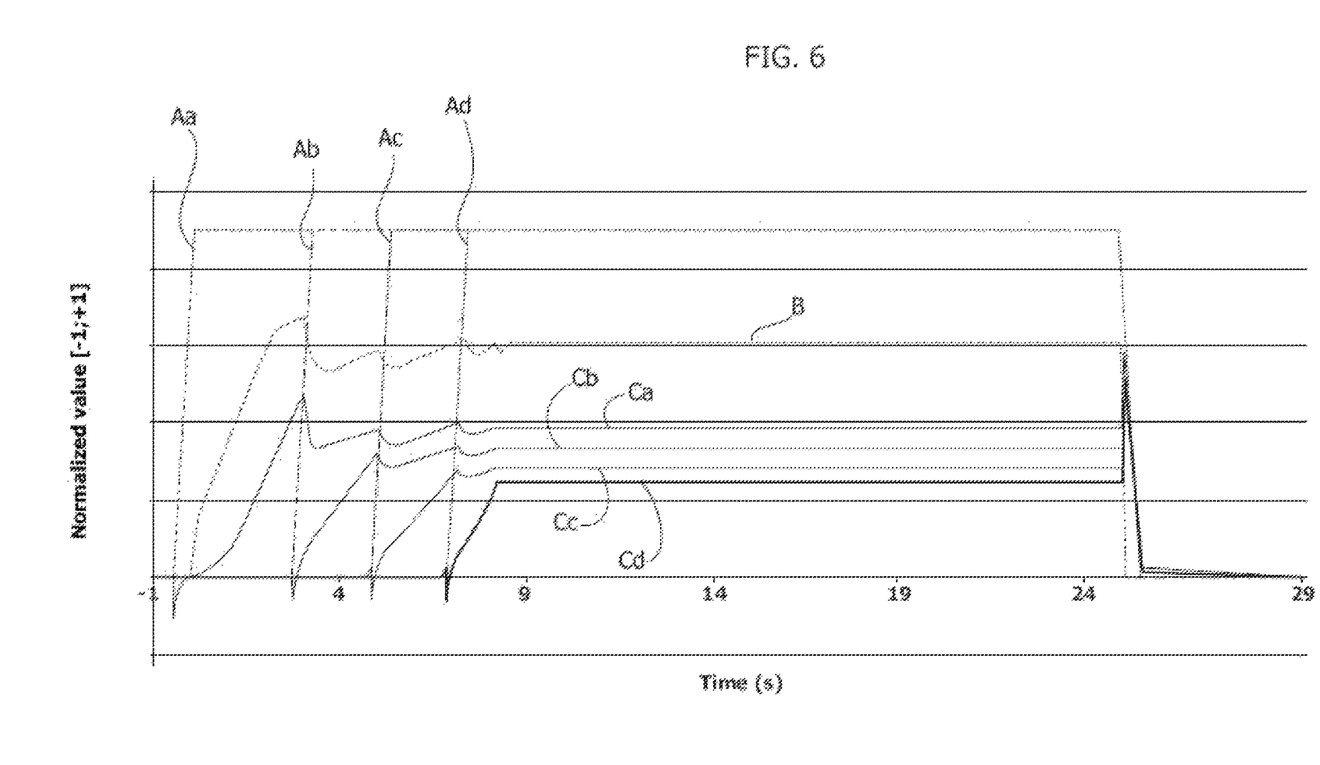
FIG. 6 is a diagram analogous to that of FIG. 2 referring to the molding apparatus of FIG. 5.

FIG. 6 is a normalized diagram that shows, as a function of the time, the stroke of the valve pins, respectively, of the central injector 3a (graph Aa), the intermediate injectors 3b and 3c (graphs Ab and Ac) and the end injectors 3d (graph Ad), the trend of the injection pressure (graph B) and the trends of the torques, respectively, of motor 8a (graph Ca), motors 8b (graph Cb), motors 8c (graph Cc) and motors 8d (graph Cd). Detecting the torque values of the motors 8a-8d allows, for example, during the sequential injection, the definition of a movement algorithm of the different valve pins 7, suitable for optimizing the cycle. For example, during the injection cycle, the various valve pins can be moved to the open position in such a way so that the torque of the motor detected for each injector has a value similar to that of the previous injector.

Even in the maintenance step and/or in the closing step, it is useful and appropriate to perform the detection of the torque absorbed by the electric motors of the injectors: for example, it can be derived from the diagram of FIG. 7, which will be discussed, that the stroke of the valve pin of the central injector Aa stops during closing, at a value close to 20% when the torque detected Ca of the respective electric motor during this brief stop is greater than a limit value, determined for example as a function of injection cycles previously carried out. The torque control in the maintenance and/or closing step, in the second case following a brief temporary stop of each valve pin 7, may allow, for example, the standardization of the torques of the electric actuators of all the injectors in these steps, also by means of movement variations of the relative valve pins, so as to more efficiently control the deformations of the molded pieces in the zones close to the injectors.

In any case, the control also based on detecting the torques applied by the electric motors allows a better balance of the pressures and distributions of the material within the mold cavity, in such a way that the pressure and density of the plastic material can be more uniform. In this way, the piece P molded at the end of the sequential process will have improved characteristics in terms of mechanical properties and aesthetic qualities.

Figure 7:
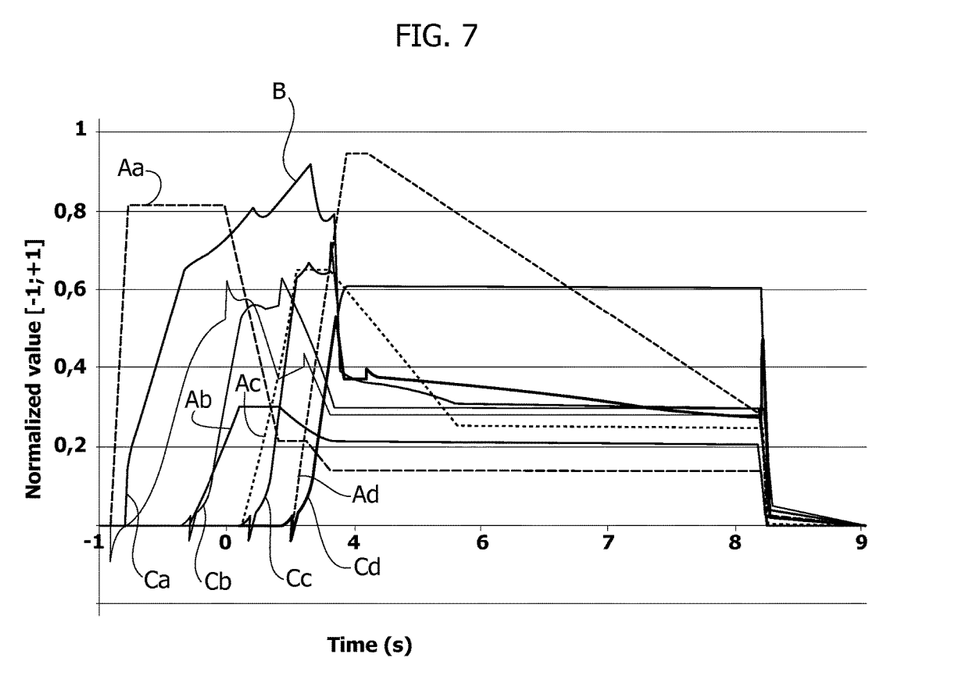
FIG. 7 is a diagram analogous to that of FIG. 3 still referring to the molding apparatus of FIG. 5.

The diagram represented in FIG. 7 also shows in this case, in terms of normalized values as a function of time, the trends of the strokes, the injection pressures and the torques developed by the electric actuators 8a-8d of the injectors 3a-3d, in the case in which a speed control of the relative valve pins 7 is provided for. For each of them, a temporary stop step may be provided, possibly followed by a brief return to the closed position, for a better detection of the torques.

The method according to the invention may conveniently include an initial calibration step in which the detection of the torque value is carried out during a series of empty opening and closing cycles of the or each valve pin 7, or rather without injection of plastic material into the mold S.

Below, the unique aspects of the molding method according to the invention will be summarized, and the effects they cause.

A. The front pressure of the valve, and therefore immediately upstream of the "gate", is correlated with the torque necessary to keep the valve in the open position or partially open position (and vice versa: the torque is correlated to the pressure).

B. This functionality is made possible by the fact that the kinematic chain between the electric motor and the valve is reversible.

C. If the valve is closed with position control, the detected torque is proportional to the pressure of the plastic material within the mold cavity at the injection point. The value is not exact because, in addition to the various frictional forces, there are phenomena of freezing of the plastic material on the gate which retain the valve.

D. The torque detected during the movement, in particular during an empty cycle, therefore without injection, but with plastic material within the nozzle, can give an indication of the viscosity of the material and its temperature. In particular, during the initial calibration steps, if the torque value exceeds the preset limits (as a function of the provided plastic material) it means that the viscosity of the molten material is not sufficient, and therefore the current temperature of the nozzle of the hot chamber is not adequate to start molding.

E. During the initial calibrations, the opening and closing limits (TDC and BDC) can be determined as a function of the unique torque required for the movement, except that the valve is free to move immersed in the molten plastic.

F. If during calibration, torque values envisaged for determined strokes of the valve are not respected within appropriate limits, the system generates errors: for example, if after finding the TDC, the system detects the BDC (owing to the increase in torque over a certain limit), before having carried out the entire mechanical stroke planned for the project, minus a tolerance, the system reports an error. An error can also be reported in the case that, during the stroke at constant speed, the torque oscillates or varies beyond certain limits, indicating, for example, jamming of the valve on the valve guide, and possible seizures, or abnormal mechanical breakages.

G. During the movements carried out during the molding cycle, it is possible to set positions and torque limits (upper and lower) to determine the correct functioning of the system and the process. The process can continue limiting the torque to these limited values, or can generate alerts or errors reported to the operator, or as an electrical signal of a discarded piece to the press or to the production island, to separate this piece from the "good" ones.

H. During molding, and in particular during the startup cycles (which can be from 10 to 30 cycles depending on the type of process) due to the slow stabilization of the process, variations in the working conditions can be reported, such as the required torques for the movement, or the closure heights, so that, for example, the plastic layer that is interposed between the pin and the "gate" can vary (generally decreasing). Another typical example is the heating of the mold, which decreases the injection pressure, and therefore the detected torques. The control system can adapt to the variation of the working conditions, no longer defining the closure height as a fixed position with respect to an absolute reference (e.g. TDC), but as a function of the overcoming of a certain torque, always within tolerance limits both of position and of torque.

I. The torque, both during the movement and when stationary, can vary continuously from negative values to positive ones, thanks to the functionality of the control software/firmware, in positions implemented in the electronic control unit of the electric motor. The torque is negative or positive as a function of the reaction that it must exert on the valve to compensate for the forces acting thereon: traction forces if there is a dragging of the valve during the injection (in practice the viscous or shear forces are high, for example, with viscous materials and very long nozzles or very large valves, so that the surface of the valve is large with respect to the annular passage section of the molten plastic material, or they can be compression or thrust forces, such as those exerted by the pressure of the plastic material which presses on the front projection of the valve (and therefore as a function of the diameter of the valve and of the injection pressure).

J. Opening of the valve can occur at one or more different speeds.

K. It is favorable and more efficient to detect the torque when the actuator is temporarily stationary.

L. In any case, it is also possible to use the torque values during movements, for example, if empty calibration cycles are used, so that the values detected during these cycles are subtracted or otherwise processed together with the graphs of the torque detected during molding.

M. Due to the coupling clearances between the pin and the actuator, the position of this may not be determined: indeed during opening, if the drag forces are high, it is verified that the valve will be closer to the lower abutment of the bayonet seat of the valve head itself, while if the pressure forces are high, the valve head will rest on the upper abutment of the bayonet seat (by lower, it is intended closer to the chamber, while higher means further away from the chamber). The same occurs during the closing movement.

N. It is preferable during the opening step to interrupt the movement for a brief moment to detect the torques and consequently the forces acting on the valve.

O. If the torques are negative, and therefore the drag index forces higher than the pressure forces, the valve will rest on the lower abutment of the seat. To detect a correct pressure it is therefore appropriate to slightly reverse the motion in order to recover the clearance on the valve head.

P. The control software can use the torque values detected for analysis or verification of the process or to set system parameters via complex algorithms.

Q. In particular, during the sequential injection, it is possible to define a movement algorithm as a function of the torques detected by more actuators.

R. The method can analyze a single molding cycle, or a defined series of cycles in order to dynamically vary the setting values of each actuator and to reach the convergence with respect to a desired result.

S. One objective can be that of obtaining equal final torques on all or a determined number of actuators, as a function of the molding and process characteristics. The system can close the "gates", by throttling the pressure transmitted downstream, so that the torques result as being be within a certain range. This range can be automatically set or determined as a function of the results of the torque obtained during a process of standard sequential injection (with opened and closed nozzles at maximum speed and at a fully open height). In this case, it is possible that the software determines the two offset ranges (preset or percentage) relative to the average value of the torques.

T. During the sequential injection step, the software can open the valves to the height necessary to maintain the relative torque at a value similar to the preceding actuator.

U. The software can also close the preceding valves, if their relative torque exceeds, during the injection step, the set values, or is greater than the torque of the actuator that follows it in the sequence. In fact, when the successive ones begin to open, the preceding actuators can begin to close until the target torque is reached. In this step, the actuator may stop in order to detect the actual torque and to decide whether to close more to further limit the torque and thus the pressure.

V. The end result is that of being able to produce a more uniform redistribution of the pressures within the cavity of the mold and therefore a better quality of the molded articles.

Of course, the embodiments of the invention may be varied widely with respect to those described and illustrated, without departing from the scope of the present invention as defined by the following claims.

What is claimed is:

1. A method for injection molding of plastic materials into a mold cavity by a molding apparatus comprising a distributor of fluid plastic material under pressure connected to at least one injector including a valve pin displaceable between a closed position and an open position, wherein the valve pin is controllably operated by an electric rotary actuator, said method providing at least one step of detecting a value of torque developed by the electric rotary actuator when the valve pin is in a path from said closed position to said open position, the detected torque value being employed to pilot a molding process.

2. The method according to claim 1, further comprising a packing step under pressure of the injected plastic material wherein the valve pin is kept stationary in the open position, and a subsequent return step of the valve pin into the closed position, and further providing at least one further step of detecting the value of the torque developed by the electric rotary actuator of the valve pin during said packing step and/or during said return step into the closed position.

3. The method according to claim 2, wherein the detected torque value is correlated to an injection pressure.

4. The method according to claim 2, wherein movement of the valve pin from the closed position to the open position is discontinuous and includes at least one temporary stop step of the valve pin in which said step of detecting the torque value is carried out.

5. The method according to claim 4, wherein said temporary stop step is followed by a return step of the valve pin towards said closed position by a preset amount.

6. The method according to claim 1, wherein the detected torque value is correlated to an injection pressure.

7. The method according to claim 1, wherein movement of the valve pin from the closed position to the open position is discontinuous and includes at least one temporary stop step of the valve pin in which said step of detecting the torque value is carried out.

8. The method according to claim 1, wherein a speed of the valve pin from the closed position to the open position is variable from a first initial speed to at least one second speed higher than the first speed.

9. The method according to claim 1, further including an initial calibration step wherein said step of detecting the torque value is carried out during a series of opening and closing cycles of the valve pin without injecting plastic material into the mold.

10. The method according to claim 1, wherein the molding apparatus comprises a plurality of injectors each one of which is operated by a respective electric rotary actuator and arranged at a generally central zone and at generally peripheral zones of the mold cavity, respectively, and wherein said plurality of injectors are operated sequentially so that the valve pins of the generally central zone injectors are displaced from the closed position to the open position before the valve pins of the generally peripheral zone injectors whereby the mold cavity is filled progressively from said generally central zone towards said generally peripheral zones, and wherein the value of the torques developed by the electric rotary actuator of each valve pin is detected and the detected torque values are employed to pilot the molding process.

11. The method according to claim 10, wherein the detected torque values are employed to render said torques essentially uniform by means of displacement variations of the relative valve pins.

* * * * *